United States Patent [19]

Allen et al.

[11] Patent Number: 4,715,234

[45] Date of Patent: Dec. 29, 1987

[54] SELF-CLEANING AND SELF-LUBRICATING FLUID FLOWMETER

[75] Inventors: Charles R. Allen, Katy; Jack D. Harshman, Missouri City, both of Tex.

[73] Assignee: Daniel Industries, Inc., Houston, Tex.

[21] Appl. No.: 886,732

[22] Filed: Jul. 18, 1986

[51] Int. Cl.[4] .............................................. G01F 1/10
[52] U.S. Cl. ................................ 73/861.91; 384/471; 415/112; 416/174
[58] Field of Search ..................... 73/861.91, 861.92; 384/471; 415/110, 111, 112; 416/174

[56] References Cited

U.S. PATENT DOCUMENTS

| | | |
|---|---|---|
| 2,089,134 | 8/1937 | Petroff . |
| 2,988,916 | 6/1961 | Waugh . |
| 3,084,545 | 4/1963 | Waugh . |
| 3,143,882 | 10/1964 | Brueckner . |
| 3,238,776 | 3/1966 | Potter ............................. 73/861.91 |
| 3,364,743 | 1/1968 | Clinton . |
| 3,686,947 | 8/1972 | Maeshiba . |
| 3,695,106 | 10/1972 | Geisow . |
| 4,155,253 | 5/1979 | Kato et al. ................... 73/861.91 X |
| 4,333,355 | 6/1982 | Dacus et al. . |

Primary Examiner—Herbert Goldstein
Attorney, Agent, or Firm—Gunn, Lee & Jackson

[57] ABSTRACT

A self-cleaning and self-lubricating fluid flowmeter comprising a tubular body forming an internal flow passage with a bearing support hub immovably positioned therein and forming a bearing receptacle. A rotor shaft extends into the bearing receptacle and supports a turbine rotor, the rotor shaft being supported by bearings located within the bearing receptacle. An increased pressure region is defined between the upstream and downstream ends of the bearing support hub, a slightly decreased pressure region is developed within the flow passage immediately downstream of the bearing support hub and is communicated into a cleaning and lubricating flow path extending from the slightly decreased pressure region upstream through the bearings, reversing and extending downstream to its terminal position at a greatly decreased pressure region further downstream of the bearing support hub. Flow through the flowmeter is conditioned for optimum measurement by a flow conditioner plate defining circular spaced concentric ribs and radially oriented ribs developing a plurality of flow conditioning openings of wedge shaped configuration and overlapping relation.

20 Claims, 3 Drawing Figures

SELF-CLEANING AND SELF-LUBRICATING FLUID FLOWMETER

FIELD OF THE INVENTION

This invention relates generally to turbine type fluid flowmeters and more specifically to a flowmeter system incorporating a turbine rotor supported by a rotatable shaft and bearing assembly. Even more specifically the present invention is directed to a fluid flow responsive system wherein the rotor shaft bearings are constantly cleaned and lubricated by the fluid medium flowing through the flowmeter mechanism.

BACKGROUND OF THE INVENTION

Turbine type flowmeters are widely utilized for measurement of flowing fluids through pipe systems. Typically, a stator is fixedly supported within the flow passage of the flowmeter and provides support for a rotor supported by a bearing system also supported by the stator. As the turbine blades of the rotor are driven by fluid flowing through the meter, magnetic impulses from a magnet carried by the rotor are sensed and converted into appropriate signals relating to the volume of fluid flow. In many cases the bearing systems of flowmeters are lubricated by a quantity of lubricant maintained within a sealed chamber. Obviously, in this case after a time the seal will fail the lubricant will be lost and erratic flow measurement signals will result. In other cases bearing systems for the rotor are exposed to the flowing fluid medium with contaminants such as line scale, sand and other particulate being excluded from the bearing assembly by close manufacturing tolerances of mating static and rotary components. In some cases an interstitial path is developed by interfitting static and rotary components thus minimizing the risk of contaminant interference with the bearing assembly. Obviously, as mechanical tolerance become more critical the resulting expense of the product usually significantly increases.

In yet further flowmeter systems such as that taught by U.S. Pat. No. 3,084,545 of Waugh, provide for cleaning and lubrication of the bearing assembly by means of the flowing fluid medium.

It is well known that fluid flowing through a piping system tends to stratify or in some cases tends to have swirls and any eddy currents disposed therein. It has been determined that location of a flow conditioner upstream of a flowmeter can improve accuracy and repeatability of a turbine flowmeter. It is desirable therefore to provide a flow conditioner system within the flow passage of a flowmeter which is located immediately upstream of the rotary turbine thereof for the purpose of enhancing accuracy and repeatability of the flowmeter.

SUMMARY OF THE INVENTION

It is a primary feature of the invention therefore to provide a novel turbine flowmeter having a bearing lubricating and cleaning system utilizing secondary flow of the fluid medium flowing through the flowmeter which is passed through the bearing assembly of the flowmeter to prevent solids buildup therein and to continuously provide the bearing system with lubrication.

It is another feature of this invention to provide a novel self-cleaning and self-lubricating fluid flowmeter having a turbine shaft rotatably supported by a bearing assembly wherein the turbine shaft defines a portion of the flow path for cleaning and lubricating fluid developed by pressure responsive secondary flow through the bearing system.

It is an even further feature of this invention to provide a novel self-cleaning and self-lubricating flowmeter incorporating a bearing support hub of a configuration developing an increased pressure region at the downstream portion thereof and a decreased pressure region immediately downstream of the rotor supported thereby, these pressure regions being utilized to develop differential pressure induced movement of fluid medium through the bearing assembly for purposes of cleaning and lubrication thereof.

Briefly, the self-cleaning and self-lubricating flowmeter includes a body structure forming an internal flow passage for the flow of fluid medium therethrough. The body is adapted for connection into a flow line transporting the fluid medium. Within the housing is located a bearing support hub which is stabilized and centralized by means of a plurality of vane elements that are secured within the body. By wedge pressure or other retainment methods, the bearing support hub forms an internal receptacle within which is seated a bearing assembly incorporating an external bearing race defining internal grooves receiving bearings such as ball bearings, roller bearings, or the like. A rotor shaft is located within the outer bearing race and forms the internal race of the bearing assembly. A turbine rotor is supported by the rotor shaft and is rotatable relative to a signal pickoff system providing signals that directly relate to rotor rotation and hence fluid flow through the flowmeter.

The rotor shaft defines an axial bore which cooperates with the annular space between the outer bearing race and rotor shaft and with a space at the inner end of the bearing assembly to define a flow path for secondary fluid flow. The initial part of this flow path is located at the increased pressure region at the downstream portion of the bearing support hub, thus causing secondary fluid flow in an upstream direction through the annulus between the outer bearing race and the rotor shaft. The terminal portion of this flow path is defined by the outlet of the rotor shaft passage which is located at a lower pressure region immediately downstream of the rotor. As fluid flows through the flowmeter therefore, a secondary flow is induced through the bearing assembly which is directed upstream through the bearing assembly, the reverses and flows downstream through the axial bore of the rotor shaft to the flow path outlet at the decreased pressure region within the flowmeter.

To enhance repeatability, accuracy and linearity of the flowmeter system, a flow conditioner plate is secured within the flowmeter upstream of the bearing support hub. The flow conditioning plate is secured by a retainer bolt extending upstream from the bearing support hub. The bearing support plate includes a plurality of flow conditioning openings defined by cooperative related concentric circular ribs and radially oriented ribs. The flow conditioner openings with the exception of a central circular opening, are of wedge shaped configuration with the area dimensions of the opening being approximately equal. The flow conditioner openings are disposed in overlapping manner with the area encompassed thereby remaining approximately equal regardless of the distance thereof from the center opening.

BRIEF DESCRIPTION OF THE DRAWINGS

In order that the manner in which the above recited features and advantages of the present invention are attained and can be understood in detail, a more particular description of the invention, may be had by reference to the specific embodiments thereof which are illustrated in the appended drawings, which drawings form a part of this specification.

It is to be noted, however, that the appended drawings illustrate only a typical embodiment of this invention and are therefore not to be considered limiting of its scope, for the invention may admit to other equally effective embodiments.

In the drawings:

FIG. 1 is a longitudinal sectional view of a self-cleaning and self-lubricating turbine flowmeter constructed in accordance with the present invention.

FIG. 2 is a transverse sectional view taken along line 2—2 of FIG. 1.

FIG. 3 is an end view taken along line 3—3 of FIG. 1 and illustrating the flow conditioning plate in detail.

DETAILED DESCRIPTION OF PREFERRED EMBODIMENT

Figure 1:
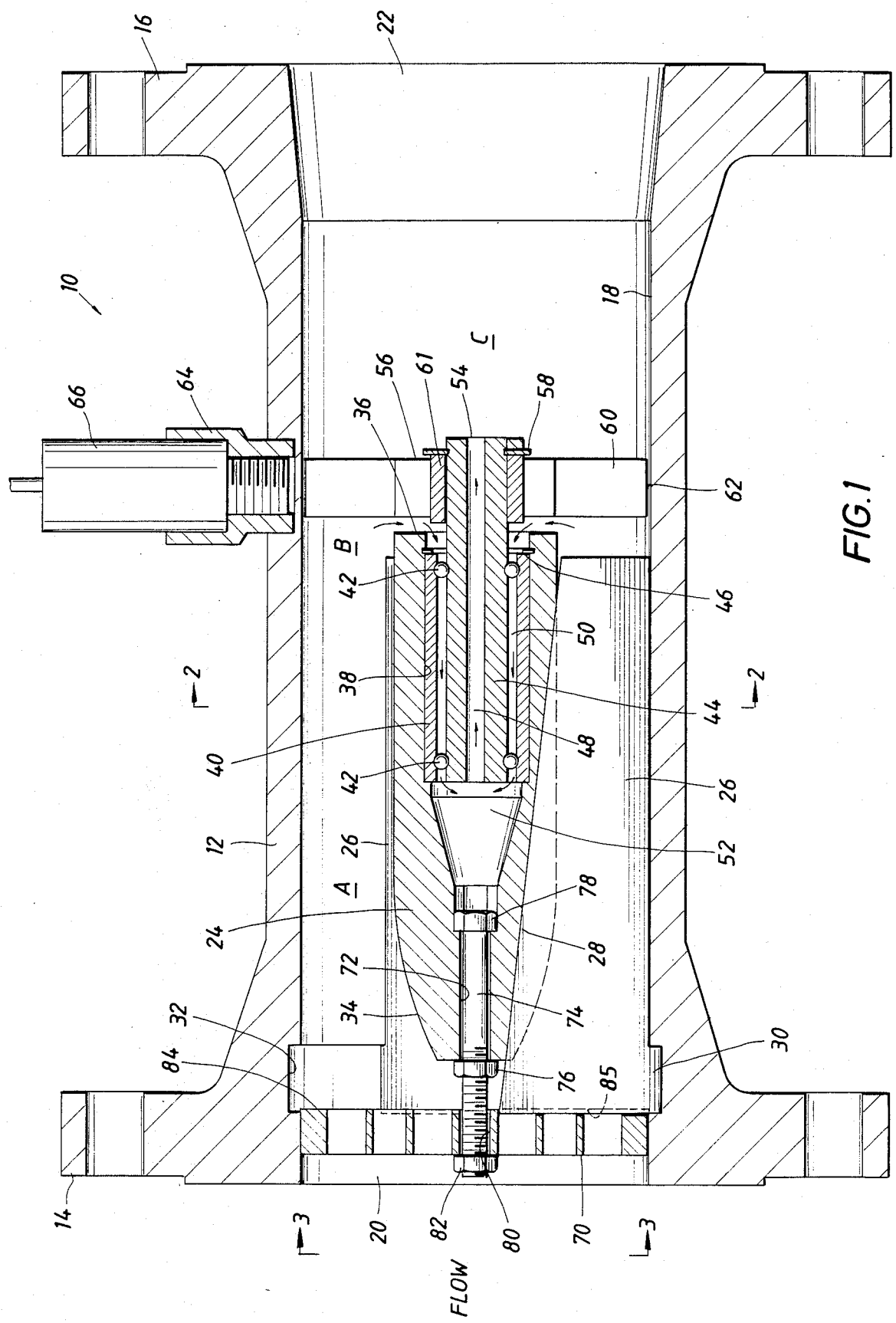
Figure 2:
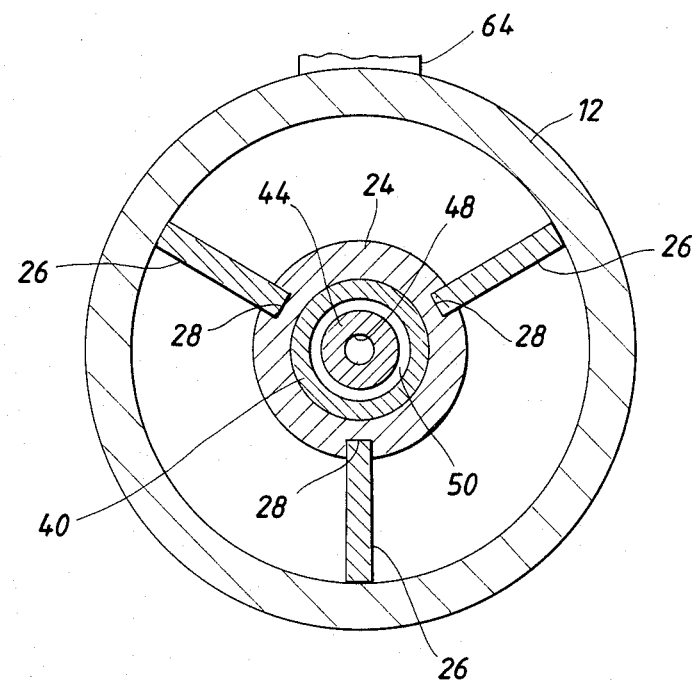

Referring now to the drawings and to first to FIG. 1, a self-cleaning and self-lubricating turbine flowmeter is illustrated generally at 10 which comprises a tubular body structure 12 having connection flanges 14 and 16 at opposite extremities thereof for connection of the flowmeter into a flow line, not shown. Obviously, other types of connection systems may be employed without departing from the spirit and and scope of this invention to secure the flowmeter into a flow line. The body structure 12 defines an internal flow passage 18 having an inlet 20 and outlet 22.

A bearing support hub 24 is secured centrally of the flow passage 18 by a plurality of positioning vane element 26. The bearing support hub defines radially oriented grooves such as shown at 28 within which the inner extremities of the vanes 26 are received. Upstream end portions 30 of the vanes project radially outwardly and are received within a circular internal body groove 32 and are secured to the body structure by a wedge action similar to the self-centering flowmeter of U.S. Pat. No. 3,948,099 which is commonly assigned herewith. The bearing support hub is therefore fixedly supported centrally within the flow passage with its longitudinal axis being coincident with the longitudinal axis of the bore forming the flow passage.

The bearing support hub 24 defines a tapered upstream end 34 and a downstream end surface 36 which is of abrupt configuration, preferably being oriented substantially normal to the longitudinal center line of the hub member. As fluid medium flows through the flowmeter, its velocity increases as it flows past the hub member 24. The fluid first flows through a region "A" defined by the annulus between the upstream and downstream ends of the bearing support hub and between the bearing support bug and the inner surface of the body structure 12. A pressure increase develops in region "A" by virtue of the restriction defined by the hub and vanes. Immediately downstream of the abrupt downstream end of the bearing support hub is defined a pressure region "B" which is at slightly lower pressure than pressure region "A" developing a slight suction which induces a flow of the fluid medium into the annular space between the hub and rotor. Further downstream of the hub member 24 a pressure region "C" is of lower pressure as compared to that present in pressure region A by virtue of the increased effective cross sectional dimension of the flow passage at region "C". The fluid pressure of increased pressure region "A" and slightly decreased pressure at region "B" and further decreased pressure at region "C" will function in the manner described above to induce secondary flow of fluid through the rotor bearing system of the flowmeter for cooling and lubrication of the bearings.

The flowmeter hub 24 is formed to define an internal bearing receptacle 38 receiving an outer bearing race 40 in close fitting relation therein. The outer bearing race 40 is of elongated tubular form and defines spaced internal bearing grooves each receiving a plurality of ball bearings 42. The ball bearings are in turn received by spaced external grooves defined in the outer periphery of a bearing shaft 44 which forms the inner bearing race of the bearing assembly. The bearing system is secured within the bearing receptacle 38 by means of a snap ring 46 which secures the outer bearing race 40 to the hub member 24.

The rotor shaft 44 defines an axial bore 48 forming a portion of a flow path through the bearing assembly for self-lubrication and self-cleaning thereof. The other portion of this flow path is defined by the annulus or space defined between the rotor shaft 44 and the inner surface of the outer bearing race 40. The annulus 50 is exposed at the downstream extremity thereof to the pressure region B immediately downstream of the hub member. The inner portion of the receptacle 38 is open as shown at 52 permitting fluid flowing through the annulus to reverse its flow as shown by the flow arrows, thus entering and flowing downstream within the axial passage 48 of the rotor shaft 44. This flow path terminates at opening 54 at the downstream extremity of the rotor shaft, opening 54 being located within the reduced pressure region C, described above. As fluid flows through the flowmeter mechanism, a continuous secondary flow of fluid is induced, which flows upstream in the annulus between the outer bearing race and rotor shaft, reverses its direction at the upstream end of the rotor shaft and then flows downstream through the central passage 48 of the rotor shaft to the outlet opening 54. A rotor member 56 is secured in nonrotatable relation to the rotor shaft 44 such as by means of a cotter pin 58 or any other suitable means of connection. The rotor member 56 defines a plurality of turbine blades 60 which receive rotary impetus from the fluid flowing through the flowmeter. As the rotor member is rotated, its outer periphery 62 moves in close proximity to a pick-up fitting 64 secured to the body structure 12. The rotor vanes 60 are supported by a rotor hub 61. The rotor hub is of a smaller diameter than that of the bearing support hub, thus particles such as sand, line scale etc., will flow past the annular space between the bearing support hub and rotor hub and thus will have less tendency to enter the bearing system. A suitable magnetic pick-up transducer is received in threaded relation within the pick-up fitting 64 and receives impulses from the rotating rotor member, which impulses are transmitted as flow responsive signals to an appropriate signal processing signal.

As mentioned above, it is desirable that fluid flowing through the flowmeter be conditioned to minimize swirling, any currents, stratification and other phenomenon contributing to flowmeter inaccuracy. To accomplish this feature, the flowmeter of the present invention is provided with a flow conditioner plate 70 at the upstream end of the flow passage 18. The bearing support hub 24 defines an axial bore 72 which is in communication with the bearing receptacle 38. A retainer shaft 74 which may be in the form of an elangated bolt member is secured in fixed relation to the hub member 24 by a retainer nut 76 and a bolt head 78. The retainer shaft 74 extends upstream from the bearing support hub and defines a central opening 80 through which the shaft 74 extends. Another retainer nut 82 is received by the retainer shaft 74 and is tightened to force the downstream side surface 84 of the flow conditioner plate 70 into seated relation with the upstream ends of the vane elements 26. The downstream surface 84 of flow conditioner plate 70 defines radially oriented grooves 85 within which the inner extremities of vanes 26 are received. Thus, the flow conditioner plate is secured in immovable relation within the upstream portion of the flow passage and oriented relative to the position of the vanes 26. Retainer nut 82 is tightened forcing retainer shaft 74 and bearing support hub 24 to move towards the upstream direction. The angle of the grooves 28 within bearing support hub 24 force the plurality of positioning vane elements 26 outwardly against internal flow passage surface 18 thereby locking rigidly supporting and centering the bearing support hub 24 in the internal flow passage 18.

Figure 3:
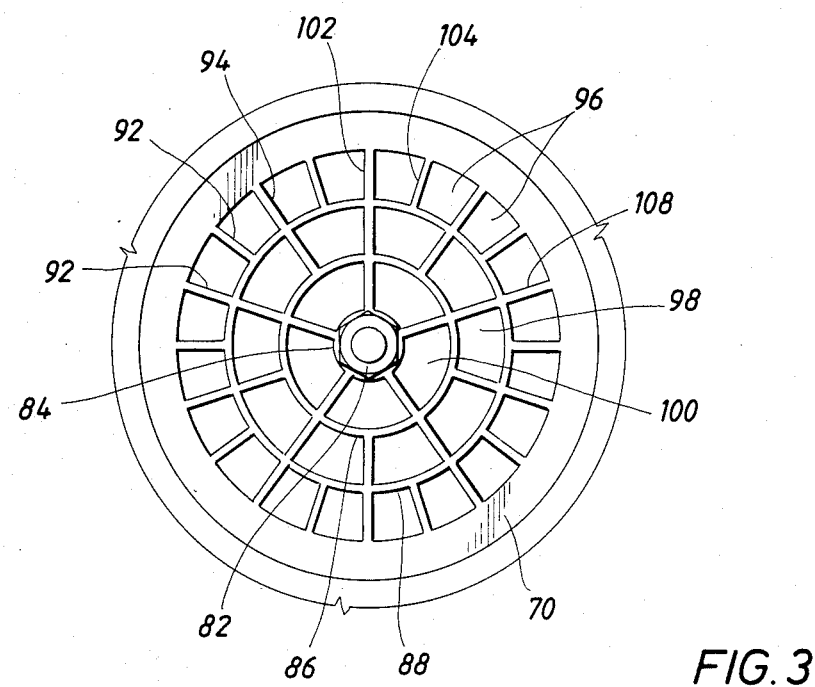

As shown in FIG. 3, the flow conditioning plate 70 defines a plurality of circular ribs 84, 86 and 88 to which are integrally interconnected a plurality of radially oriented ribs such as shown at 90, 92, and 94. It should be noted that radially oriented rib 90 is interconnected with each of the circular ribs while rib 92 extends only to the outer circular rib 88. Radially oriented rib 94 extends to the outer two circular ribs 86 and 88. This arrangement defines a plurality of flow conditioning openings 96, 98, and 100. Each of the flow conditioning openings is of generally arcuate, wedge shaped configuration, the openings at the inner portion of the flow conditioner plate being of substantially the same area dimension as compared with those at the outer most portion of the plate. Rib orientation is such that the flow conditioning openings overlap one another. This rib design provides the flow conditioner plate with exceptional strength even though the circular and radial ribs are quite thin. For purposes of explanation, the angular orientation of the radial ribs is depicted in FIG. 3. Rib members 102 and 104 define an angular spacing of 15° while radial rib member 106 has angular spacing of 15° from rib 104 and 30° from rib 102. Radial rib member 108 has 60° angular spacing from radial rib 102 and 30° spacing from radial rib 106. Thus, each of the radial ribs engaging the inner most circular rib 84 have an angular spacing of 60°. Each of the rib members engaging the intermediate circular rib 86 have an angular spacing of 30°. Likewise, each of the radially oriented ribs extending from the radially outer portion of the flow conditioner plate and contacting the outer most circular rib 88, have an angular spacing of 15°. In a typical 4 inch flowmeter design, the flow conditioner plate 70 may have an outer diameter of 3.8 inches and a thickness of 0.47 inches. The diameter of the combined flow conditioning openings may have a diameter of 3.562 inches while the circular ribs may define diameters of 7.469 inches, 1.526 inches and 0.625 inches.

As the fluid medium flowing through the flow line reaches the flow conditioner plate 70, the large dimension and multiple ribs together with the multiple radiating, overlapping orientation of the flow conditioning openings, remove substantially all of the flow irregularities such as turbulence, any currents, stratification, etc. The fluid flow acting upon the rotor member 56 is quite efficiently stabilized and has demonstrated efficiency of fluid flow measurement capability.

In a test, a 12 inch turbine meter was place in a flow line between two butterfly valves having a maximum allowable distance between the two valves of only 7½ diameters, leaving about 4 diameters of upstream pipe length ahead of the turbine meter. A number of turbine meter flow calibrations were conducted with different upstream configuration to attain a calibration curve which would be similar to the calibration curve for a long upstream pipe section. Since exact field installation flow configuration could not be duplicated in the flow laboratory, an effort was made to simulate the flow configuration of the field installation. At first, the base line calibration for the turbine meter was obtained for the piping configuration of the butterfly valve followed by a 30 diameter straight pipe section before the turbine meter. There additional turbine meter calibrations were conducted for different piping arrangements with and without a flow conditioner plate present to achieve the desired turbine meter performance for which the total upstream length would be about 4 diameters.

The 12 inch turbine meter calibrations were conducted in a 30 inch ball type meter prover. Since the upstream butterfly valve was considered more critical to the performance of the turbine meter, the turbine meter configuration was placed next to the butterfly valve in the header section of the 30 inch prover line. The minimum upstream length studied for the test was 2¼ diameters and the final configuration for the turbine meter was for upstream length of 4½ diameters having a basket strainer and a Daniel Industries type flow conditioner or manipulator.

The calibration is considered to document the actual performance characteristics of the turbine meter under desirable installation conditions. For the base line calibration, a tube-bundle flow straightner was placed in the upstream section of the pipe. The average meter factor was 206.398 pulses/barrel. The test incorporating the basket strainer illustrated detoriorated performance of the turbine meter. The calibration curve exhibited a meter linearity of about ±0.4%. The meter factor increased to 207.805 pulses/barrel and the repeatability was very poor. The meter test with increased upstream length exhibited an improvement in the performance of the meter. The calibration curve indicated that linearity was about ±0.25% but the repeatability of the meter was considered poor. The meter factor increased to about 208.746 pulses/barrel. The test involving the Daniel Industries flow conditioner or manipulator of the present invention, shown at 70 in FIGS. 1 and 3 exhibit excellent results. The turbine meter calibration curve exhibited excellent meter repeatability over the entire calibration flow range. Every flow rate was repeated at least once. Linearity of the meter was less than ±0.25% and the meter factor was 207.131 pulses/barrel. These test indicated that the flowmeter system of the present invention including the flow conditioning plate should exhibit excellent flowmeter performance over a wide range of flow rates and pressures.

Another test was conducted to determine flow and flow rate of secondary lubricating and cleaning fluid medium that occurs responsive to flowmeter operation. A test fixture was prepared with an injector being in communication with the annulus 50 of the bearing assembly. The injector was prepared to inject granules of thymol blue in concentrated solution form into the upstream portion of the flow path defined by the bearing annulus. As fluid medium was flowing through the flowmeter dye was slowly injected into the annulus. This dye was transported along with the secondary flowing medium through the bearing assembly and through the passage 48 of the rotor shaft 44 to the outlet opening 54. This secondary lubricating and cleaning flow appeared to be directly proportional to the mean flow rate through the flowmeter.

The flowmeter of this invention has a continual secondary flow of the flowing fluid over the entire operating range of the meter. Since the meter is calibrated with the flow in the secondary path, the meter factor obtained from the calibration curve remains valid for the actual flow measurement. The secondary flow through the bearing mount causes continuous lubrication and cleaning of the bearing to minimize bearing wear and prevent buildup of solid material which might interfere with operation of the bearing assembly and rotation of the rotor which would otherwise influence meter accuracy and repeatability.

In view of the foregoing, it is respectfully submitted that the present invention is one well adapted to attain all of the features hereinabove set forth, together with other features that our inherent in the apparatus illustrated and described herein.

What is claimed is:

1. A self-cleaning and self-lubricating fluid flowmeter comprising:
   (a) body means adapted for connection into a flow line and forming an internal flow passage for a fluid medium to flow therethrough;
   (b) a bearing support hub being immovably positioned with said internal flow passage and forming a bearing receptacle;
   (c) a turbine rotor;
   (d) a rotor shaft extending into said bearing receptacle and supporting said turbine rotor in immovable assembly therewith;
   (e) bearing means disposed within said bearing receptacle and establishing rotatable support for said rotor shaft and rotor, said bearing means and said rotor shaft cooperatively defining a flow path extending upstream from the downstream extremity of said bearing suport hub, passing through said bearing means, reversing direction and terminating at a location downstream of said downstream extremity of said bearing support hub;
   (f) said bearing support hub being of a configuration for developing differential pressure responsive flow of said fluid medium through said flow path; and
   (g) means developing signals responsive to fluid medium induced rotation of said turbine rotor.

2. A self-cleaning and self-lubricating fluid flowmeter as recited in claim 1, wherein:
   said rotor shaft defines an axial passage forming a part of said flow path.

3. A self-cleaning and self-lubricating fluid flowmeter as recited in claim 1, wherein said bearing means comprises:
   (a) outer bearing race means being supported in immovable relation within said bearing receptacle of said support hub; and
   (b) ball bearings supporting said rotor shaft in spaced rotatable relation with said outer bearing race means and forming an annulus between said outer bearing race means and said rotor shaft that defines a first portion of said flow path.

4. A self-cleaning and self-lubricating fluid flowmeter as recited in claim 3, wherein:
   said rotor shaft defines an axial bore forming a second portion of said flow path.

5. A self-cleaning and self-lubricating fluid flowmeter as recited in claim 4, wherein:
   said bearing support hub forms a portion of said flow path communicating said first and second portions of said flow path.

6. A self-cleaning and self-lubricating fluid flowmeter as recited in claim 3, wherein:
   (a) said outer bearing race means is of elongated tubular form having ball retaining grooves near respective extremities thereof;
   (b) said rotor shaft forming ball retaining grooves; and
   (c) said ball bearings being retained by said ball retaining grooves of said outer bearing race and rotor shaft.

7. A self-cleaning and self-lubricating fluid flowmeter as recited in claim 1, wherein:
   (a) said bearing support hub forming a downstream surface oriented substantially normal to the longitudinal axis thereof; and
   (b) said turbine rotor being located immediately downstream of and in slightly spaced relation with said downstream surface defining a space in communication with said flow passage.

8. A self-cleaning and self-lubricating fluid flowmeter as recited in claim 1, wherein:
   (a) said body means defines an annular receptacle upstream of said bearing support hub; and
   (b) flow conditioner means is received within said annular receptacle, and defines rib means forming a plurality of non-circular, circular oriented flow conditioning openings.

9. A self-cleaning and self-lubricating fluid flowmeter as recited in claim 8, wherein said rib means comprise:
   substantially concentric circular rib means and radially oriented rib means being so oriented that said circular oriented flow conditioning openings are of wedge shaped configuration.

10. A self-cleaning and self-lubricating fluid flowmeter as recited in claim 9, wherein:
    the area of said flow conditioning openings is substantially equal.

11. A self-cleaning and self-lubricating fluid flowmeter as recited in claim 10, wherein:
    the inner most one of said circular rib means forms a circular opening receiving retainer means to secure said flow conditioner means within said body means.

12. A self-cleaning and self-lubricating fluid flowmeter as recited in claim 1, wherein:
    (a) said bearing support hub defines a plurality of radially oriented grooves; and
    (b) a plurality of support vanes are received within said radially oriented grooves and are positioned in fixed relation within said body means.

13. A self-cleaning and self-lubricating fluid flowmeter as recited in claim 8, wherein
    retainer means extends from said bearing support hub and secures said flow conditioner in immovable assembly within said flow passage of said body means.

14. A self-cleaning and self-lubricating flowmeter, comprising:
(a) body means adapted for connection into a flow line and forming an internal flow passage for a fluid medium to flow therethrough;
(b) a bearing support hub being immovably positioned within said internal flow passage and forming a bearing receptacle, said bearing support hub being of a configuration developing first pressure region of increased pressure between the upstream and downstream portions of said hub, a second pressure region having a pressure slightly lower than said increased pressure region at the downstream end of said bearing support hub, said flowmeter configuration developing a decreased pressure region third pressure region downstream of said second pressure region and being of lower pressure than that of said first and second pressure regions;
(c) a rotor shaft extending into said bearing receptacle;
(d) a turbine rotor being secured in immovable relation to said rotor shaft and being positioned immediately downstream of and in spaced relation with said bearing support hub;
(e) bearing means disposed within said bearing receptacle and establishing rotatable support for said rotor shaft;
(f) means defining a flow path extending upstream from said second pressure region and through said bearing means, reversing direction and terminating within said third pressure region; and
(g) means developing signals responsive to fluid medium induced rotation of said turbine rotor.

15. A self-cleaning and self-lubricating flowmeter as recited in claim 14, wherein:
said rotor shaft defines an axial passage forming a part of said flow path.

16. A self-cleaning and self-lubricating flowmeter as recited in claim 14, wherein:
(a) outer bearing race means being supported in immovable relation within said bearing receptacle of said support hub; and
(b) ball bearings supporting said rotor shaft in spaced rotatable relation with said outer bearing race means and forming an annulus between said outer bearing race means and said rotor shaft that defines a first portion of said flow path.

17. A self-cleaning and self-lubricating flowmeter as recited in claim 16, wherein:
(a) said outer bearing race means is of elongated tubular form having ball retaining grooves near respective extremities thereof;
(b) said rotor shaft forming ball retaining grooves; and
(c) said ball bearings being retained by said ball retaining grooves of said outer bearing race and rotor shaft.

18. A self-cleaning and self-lubricating flowmeter as recited in claim 14, wherein:
(a) said bearing support hub forming a downstream surface oriented substantially normal to the longitudinal axis thereof; and
(b) said turbine rotor being located immediately downstream of and in slightly spaced relation with said downstream surface defining a space in communication with said flow passage.

19. A self-cleaning and self-lubricating flowmeter as recited in claim 14, wherein:
(a) said body means defines an annular receptacle upstream of said bearing support hub; and
(b) flow conditioner means is received within said annular receptacle, and defines rib means forming a plurality of non-circular, circular oriented flow conditioning openings.

20. A self-cleaning and self-lubricating flowmeter as recited in claim 14, wherein:
(a) said bearing support hub defines a plurality of radially oriented grooves; and
(b) a plurality of support vanes are received within said radially oriented grooves and are positioned in fixed relation within said body means.

* * * * *